United States Patent
Graham et al.

(10) Patent No.: US 10,789,145 B2
(45) Date of Patent: Sep. 29, 2020

(54) SYSTEM AND METHOD FOR IMPLEMENTING A SERVER CONFIGURATION DRIFT MONITORING TOOL

(71) Applicant: JPMorgan Chase Bank, N.A., New York, NY (US)

(72) Inventors: Mitchell Graham, Dublin, OH (US); Brian S. Elliott, Worthington, OH (US); Emily R. Hoffman, Columbus, OH (US); William Gregory, London, OH (US); Nebras Alnemer, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 173 days.

(21) Appl. No.: 15/966,140

(22) Filed: Apr. 30, 2018

(65) Prior Publication Data

US 2018/0314439 A1 Nov. 1, 2018

Related U.S. Application Data

(60) Provisional application No. 62/491,647, filed on Apr. 28, 2017.

(51) Int. Cl.
| | | |
|---|---|---|
| *G06F 11/00* | (2006.01) | |
| *G06F 11/30* | (2006.01) | |
| *G06F 3/06* | (2006.01) | |
| *H04L 12/24* | (2006.01) | |
| *G06F 11/14* | (2006.01) | |

(52) U.S. Cl.
CPC .......... *G06F 11/301* (2013.01); *G06F 3/0614* (2013.01); *G06F 3/0629* (2013.01); *G06F 3/0653* (2013.01); *G06F 11/1446* (2013.01); *G06F 11/3006* (2013.01);
(Continued)

(58) Field of Classification Search
CPC ............... G06F 11/301; G06F 11/3006; G06F 11/3051; G06F 11/3093; G06F 11/1446; G06F 11/3072; G06F 3/0614; G06F 3/0629; G06F 3/0653; H04L 41/046; H04L 41/0853
See application file for complete search history.

(56) References Cited

U.S. PATENT DOCUMENTS

| | | | |
|---|---|---|---|
| 2009/0106256 A1* | 4/2009 | Safari | ................. G06F 11/1433 |
| 2010/0185596 A1* | 7/2010 | Dee | ...................... H04L 41/0859 707/695 |

(Continued)

*Primary Examiner* — Joseph D Manoskey
(74) *Attorney, Agent, or Firm* — Hunton Andrews Kurth LLP

(57) ABSTRACT

The invention relates to a server configuration drift monitoring tool that allows for active monitoring of server configurations. The Monitoring Tool has little overhead and may be quickly and easily integrated with a current or new environment. With simple configuration files available, an administrator may customize necessary settings. The Monitoring Tool may run on various platforms, including Platform as a Service (PaaS) offerings, and may be compiled into a program component. The Monitoring Tool allows users and administrators to access a dashboard (via any web browser or mobile device), showing current connections and the ability to select components/devices to do a side by side comparison.

20 Claims, 6 Drawing Sheets

(52) U.S. Cl.
CPC ........ *G06F 11/3051* (2013.01); *H04L 41/046* (2013.01); *H04L 41/0853* (2013.01); *G06F 11/3093* (2013.01)

(56) References Cited

U.S. PATENT DOCUMENTS

| | | | |
|---|---|---|---|
| 2011/0225275 A1* | 9/2011 | Shah | G06F 9/44505 709/223 |
| 2012/0096065 A1* | 4/2012 | Suit | H04L 12/6418 709/202 |
| 2016/0173525 A1* | 6/2016 | Thomas | H04L 63/20 726/23 |
| 2017/0255874 A1* | 9/2017 | Chafle | G06F 11/3452 |

\* cited by examiner

From:
To:
Cc:
Subject: Comparison — 410

Hello, below is a table with a side by side comparison.

| Name | Server One | Server Two |
|---|---|---|
| initialHeapSize | 512 | 614 |
| maximumHeapSize | 512 | 768 |
| MQ_CLEAR_MQ_ | | MQ_CLEAR_MQ_ |
| MQ_INSTALL_ROOT | | MQ_INSTALL_ROOT |
| AM_CONFIG_ | AM_CONFIG_ | |
| AM_OLD_ | AM_OLD_ | |
| ITCAMDCHOME | ITCAMDCHOME | |
| TEMAGCCollector.gclog.path | LOG:SYSOUT:KEEP | |

Figure 4

SYSTEM AND METHOD FOR IMPLEMENTING A SERVER CONFIGURATION DRIFT MONITORING TOOL

CROSS REFERENCE TO RELATED APPLICATIONS

The application claims priority to U.S. Provisional Application 62/491,647, filed Apr. 28, 2017, the contents of which are incorporated herein in its entirety.

FIELD OF THE INVENTION

The invention relates generally to a system and method for implementing a server configuration drift monitoring tool that actively monitors and/or updates server configurations and provides side-to-side comparisons of server components over a range of time frames.

BACKGROUND OF THE INVENTION

Monitoring server configurations is currently a cumbersome and slow process, in particular when the environment grows to thousands of servers. Current monitoring tools are not able to cross over environments, such as that between development and production. Without the ability to quickly compare servers at any given time, administrators struggle to understand what changes have taken place in their environment. This is especially true with many self-servicing tools in use. Many applications require large overhead and need to be in place prior to the growth of the environment. If these applications are not in place prior to growth, retroactively fitting them can become tedious and messy. Finally, many applications require users to log their changes in the monitoring application or cannot track changes that were not completed through their application.

These and other drawbacks currently exist.

SUMMARY OF THE INVENTION

According to one embodiment, the invention relates to a Service Configuration Drift Monitoring Tool comprising: a database interface that accesses server configuration data stored in a database; a server interface configured to communicate with a Communication Server; an interactive user interface that receives user inputs and generates an interactive display; and a computer processor, coupled to the database interface, the server interface and the interactive user interface, configured to perform the steps of: communicating with one or more software agents, each software agent associated with a logical partition (LPAR) that comprises one or more servers; accessing, via the one or more software agents, configuration data for each of the one or more of servers associated with the LPAR; performing a side-by-side comparison of a set of elements between configuration data associated with a first server at a first point in time and configuration data associated with a second server at a second point in time; and communicating, via the interactive user interface, the side by-side comparison.

According to one embodiment, a method implements a Server Configuration Drift Monitoring Tool. The method comprising the steps of: communicating, via a communication network, with one or more software agents, each software agent associated with a logical partition (LPAR) that comprises one or more servers; accessing, via the one or more software agents, configuration data for each of the one or more of servers associated with the LPAR; storing, via a database interface, configuration data in a database; performing, by a computer processor, a side-by-side comparison of a set of elements between configuration data associated with a first server at a first point in time and configuration data associated with a second server at a second point in time; and communicating, via the interactive user interface, the side by-side comparison.

The system may include a specially programmed computer system comprising one or more computer processors, interactive interfaces, electronic storage devices, and networks.

The computer implemented system, method and medium described herein provide unique advantages to developers, administrators and other users according to various embodiments of the invention. The innovative Server Configuration Drift Monitoring Tool allows for active monitoring and altering of server configurations. The Monitoring Tool has little overhead and does not require a lot of memory to run. Moreover, the Monitoring Tool may be quickly and easily integrated with a current or new environment. The innovative system provides comparisons over a range of time frames, for example, comparing a current server to itself a week or a day ago. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 is an exemplary interface that illustrates an electronic communication, according to an embodiment of the present invention.

DETAILED DESCRIPTION OF THE PREFERRED EMBODIMENT(S)

Figure 1:
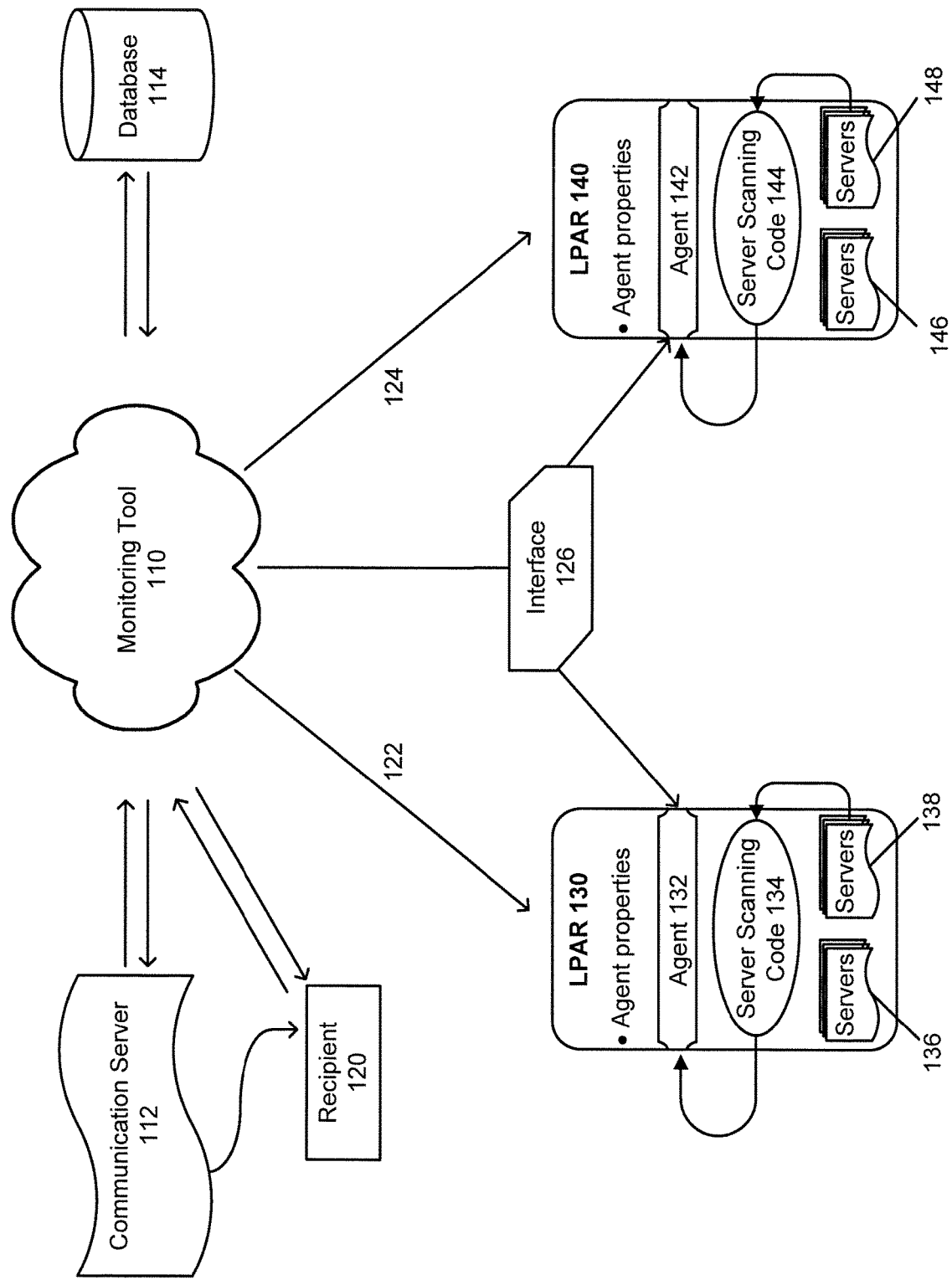
FIG. 1 illustrates a schematic diagram of a Server Configuration Drift Monitoring Tool, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Configuration drift may be caused by inconsistent configuration items (CIs) across computers or devices. Configuration drift occurs naturally in data center environments when changes to software and hardware are made ad hoc and are not recorded or tracked in a comprehensive and systematic fashion. Configuration drift accounts for many high availability and disaster recovery system failures. To prevent configuration drift, administrators may be required to maintain detailed information about the network addresses of hardware devices as well as what software versions are running on them and which updates have been applied.

An embodiment of the present invention is directed a Monitoring Tool that allows for active monitoring as well as automatic updating of server configurations. The Monitoring Tool may monitor network addresses and ports as well as server configurations. The Monitoring Tool has little overhead and may be quickly and easily integrated with a current or new environment. With simple configuration files available, an administrator may customize necessary settings. The Monitoring Tool may run on various platforms, including Platform as a Service (PaaS) offerings, and may be compiled into a program component. The Monitoring Tool allows users and administrators to access an interactive user interface or dashboard (via any web browser or mobile device) that shows current connections (to LPARS—systems that are being monitored) and the ability to select these servers to do a side by side comparison. LPAR represents a logical partition or a division of computer systems, processors, memory and/or components into multiple sets of resources. Accordingly, the Monitoring Tool of an embodiment of the present invention addresses configuration drift problems and further addresses inconsistencies in configuration data in various systems.

Agents may represent a program component that runs on each system to be monitored. A monitored system may represent a system, a plurality of systems, a subsystem, component, collection of components, etc. For example, the monitored system may represent one or more components at a single location, distributed across multiple locations and/or supported by various other architectures and implementations. A scanning code may then run or execute on each monitored system and report findings, observations, metrics and/or other data to the Agent. This may include configuration settings and other configuration data. The Agent may then forward the information to the Monitoring Tool which may then store the data in a memory component, such as a database. The database may be distributed, local, remote, etc. The Monitoring Tool may configure and provide electronic communications, e.g., emails, to various users, administrators and/or other recipients depending on the findings, priority settings, profiles, etc. The Monitoring Tool may also apply alerts so that conditions that reach a predetermined threshold may trigger notifications to certain individuals, systems, recipients, etc.

According to another example, The Monitoring Tool may contact Agents and send updated scanning code. This may occur on a regular or predetermined interval.

Agents may execute on various environments including testing, development, QA, production and other environments. The Monitoring Tool does not require setup (besides basic configuration) and may be retroactively fitted in an environment. Once deployed, the Monitoring Tool may begin collecting data and store the data for comparisons and other analysis.

According to an embodiment of the present invention, each Agent may be associated with a particular system and/or other defined collection of components. For example, an Agent may monitor a particular category or group of servers on a given LPAR. Also, there may be multiple agents per LPAR, as each Agent may monitor a separate system, where one Agent monitors a first category/group of servers and another Agent monitors a second category/group of servers, for example. Other configurations and architectures may be supported.

The Monitoring Tool enables seamless integration and consistent monitoring. The Monitoring Tool may run an analysis on any system across various environments at any given time. When run, the Monitoring Tool may store configuration settings in a database, so that they may be viewed at a later time. Currently available monitoring tools are limited to live views only. The Monitoring Tool implements database storage that allows the Monitoring Tool to compare configurations over time. Additionally, the Monitoring Tool offers an interactive user interface or dashboard that provides users with a side by side comparison, indicating which settings are different between servers. Users may compare servers from different times and different environments. An important feature of the Monitoring Tool is that it does not need to be in place before the environment is built and does not require extensive work to setup in a currently operational environment; this is not the case with other products, which require one to "rebuild" the environment in their system. Moreover, the Monitoring Tool and Agents use little overhead.

The Monitoring Tool may implement various modifications and improvements as well. For example, the Monitoring Tool may work with other systems and applications beyond server configuration files and specifically beyond servers. Dashboard views and options may be customized on a per person basis and offer users actions that they are authorized for. The Monitoring Tool may feed into other alert systems and allow for users to be alerted, via various forms of communication.

According to an embodiment of the present invention, artificial intelligence and/or machine learning may be integrated and performance monitors may be built and packaged. With the ability to monitor changes while viewing the results on performance, artificial intelligence may provide insights into what a change will do and what changes should be implemented in order to optimize a particular environment. With the ability to run code on the client (through the Agent), an embodiment of the present invention may control various components of a system. The dashboard may make changes to the environment, though user intervention or through the use of artificial intelligence.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

FIG. 1 illustrates a schematic diagram of a Server Configuration Drift Monitoring Tool, according to an exemplary embodiment. As shown in FIG. 1, Monitoring Tool 110 may represent a Configuration Drift Monitoring Tool on any Platform-as-a-Service (PaaS) and/or other platform or service. Monitoring Tool may communicate with one or more recipients represented by 120 via Communication Server 112. Communication Server 112 may provide various forms of electronic communication (e.g., email, text, voicemail, notification, dashboard, etc.). Monitoring Tool 110 may access and retrieve data from Database 114, which may manage data (e.g., server configuration data, etc.). According to another example, Database 114 may also store and managing scanning code, where the scanning code may be sent to Agents and executed on monitored systems. Other sources of data may be accessed and integrated. Database 114 is representative and may support other memory components and configurations, architectures and environments.

Monitoring Tool 110 may monitor configuration data associated with multiple logical partitions (LPAR) represented by 130, 132, via an Interface 126. Interface 126 may represent a REST Interface or API. LPAR may represent a subset of a computer's hardware resources, virtualized as a separate computer. For example, a physical machine may be partitioned into multiple logical partitions, each hosting a separate operating system. LPAR 130 may comprise Agent 132, Server Scanning Code 134, and Servers 136, 138. Agent 132 may represent software code that retrieves configuration data. The configuration data may be stored in Database 114. The configuration data may then be used to perform comparisons via Monitoring Tool 110. Monitoring Tool 110 may communicate with LPAR 130, 140 via communication networks 122, 124. As shown in FIG. 1, Monitoring Tool 110 may send data transmissions over HTTP(S) or other communication protocol. According to another example, Monitoring Tool 110 may communicate via a Thread for Agent or other component that represents part of the code that allows the application to run multiple "mini applications" inside of it. This enables the Monitoring Tool to communicate with multiple various agents and process code from many agents at or around the same time.

For example, Monitoring Tool 110 may initiate a scan and analyze an entire system (or a defined subset of the system) and identify various different configurations. The scan may be controlled by an Agent and performed by scanning code. Monitoring Tool 110 may then perform a side-by-side comparison between the systems and also between the same systems on prior days (or other time periods). For example, Monitoring Tool 110 may compare System X to System Y and compare it to itself to a prior time period (e.g., yesterday, a week before, a month before, etc.).

According to an exemplary application, changes may be made in a test environment. A user may want to make sure that the same or corresponding changes are made in a production environment. In response, the Monitoring Tool may run a comparison between the test environment and the production environment before deploying production to ensure that changes and updates have been captured.

According to another example, a system may encounter a production issue on one system but not on another system. The Monitoring Tool may then perform a comparison between two production systems to identify and address the production issue.

The Monitoring Tool may perform a comparison that may be predetermined (e.g., type of comparison, elements to compare, etc.) and may be performed by a schedule (e.g., every 24 hours), a triggering event (e.g., threshold determination), user input (e.g., user interface) and/or responsive to other condition or input.

According to yet another example, the Monitoring Tool may capture the configurations on a daily (or other periodic) basis, run comparisons between two or more systems and provide the resulting information to an authorized user or team. The resulting information may be provided on an interactive user interface. The interface may also alert issues, such as significant changes over a period of time for review and/or action. For example, the interface may identify configuration differences over the last 24 hours and request confirmation or user approval, e.g., confirm that the configuration changes are proper or within an acceptable range.

The Monitoring Tool may also update and/or alter configuration data. For example, Monitoring Tool may collect, manage and/or present configuration information for a server. This configuration may be compared to the configuration on a previous date. The Monitoring Tool may automatically restore configuration to a previous date (or other identified point in time) to restore a system (or system component) to a stable configuration or revert to an unwanted change. Other scenarios that involve making changes and/or altering the server configuration may be realized.

Figure 2:
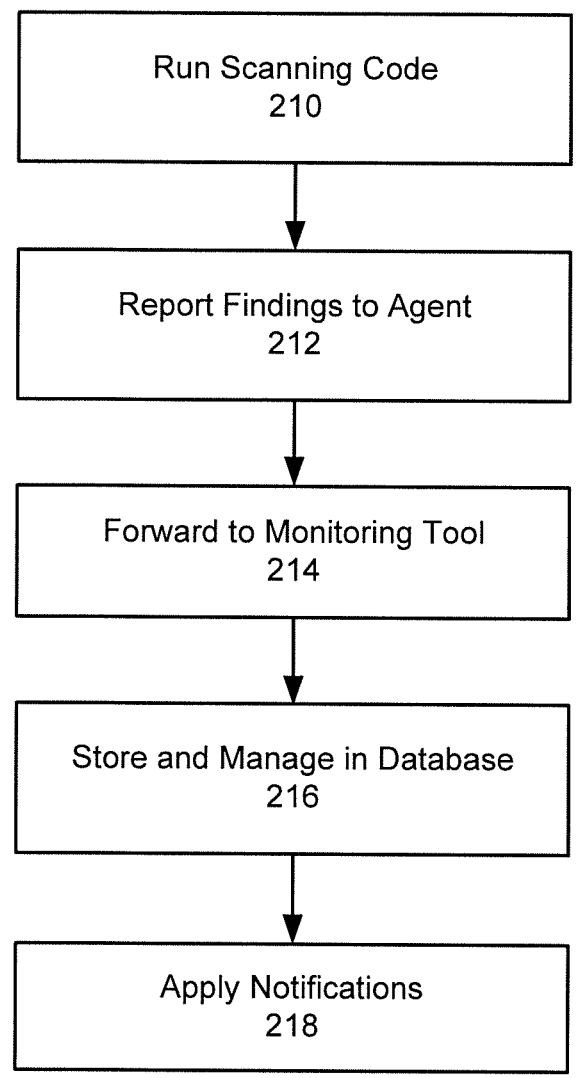
FIG. 2 illustrates an exemplary flowchart for implementing a Monitoring Tool, according to an embodiment of the present invention.

FIG. 2 illustrates an exemplary flowchart for implementing a Monitoring Tool, according to an embodiment of the present invention. At step 210, the software agents may run or execute the scanning code on each system. Each system may include various servers and other processing components. According to another embodiment, a Monitoring Tool may contact software agents associated with a system to be monitored. In this example, the Monitoring Tool may send updated scanning code. At step 212, the monitored system may report findings, which may include configuration settings, to a respective software agent. At step 214, the software agents may forward the findings to the Monitoring Tool. At step 216, the findings may be stored and managed in a memory component, such as a database. At step 218, the system may communication predetermined notifications based on the findings to one or more recipients. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

FIGS. 3-6 represent exemplary illustrations of user interfaces. Other variations in the presentation of user interactive components may be supported in accordance with the embodiments of the present invention.

Figure 3:
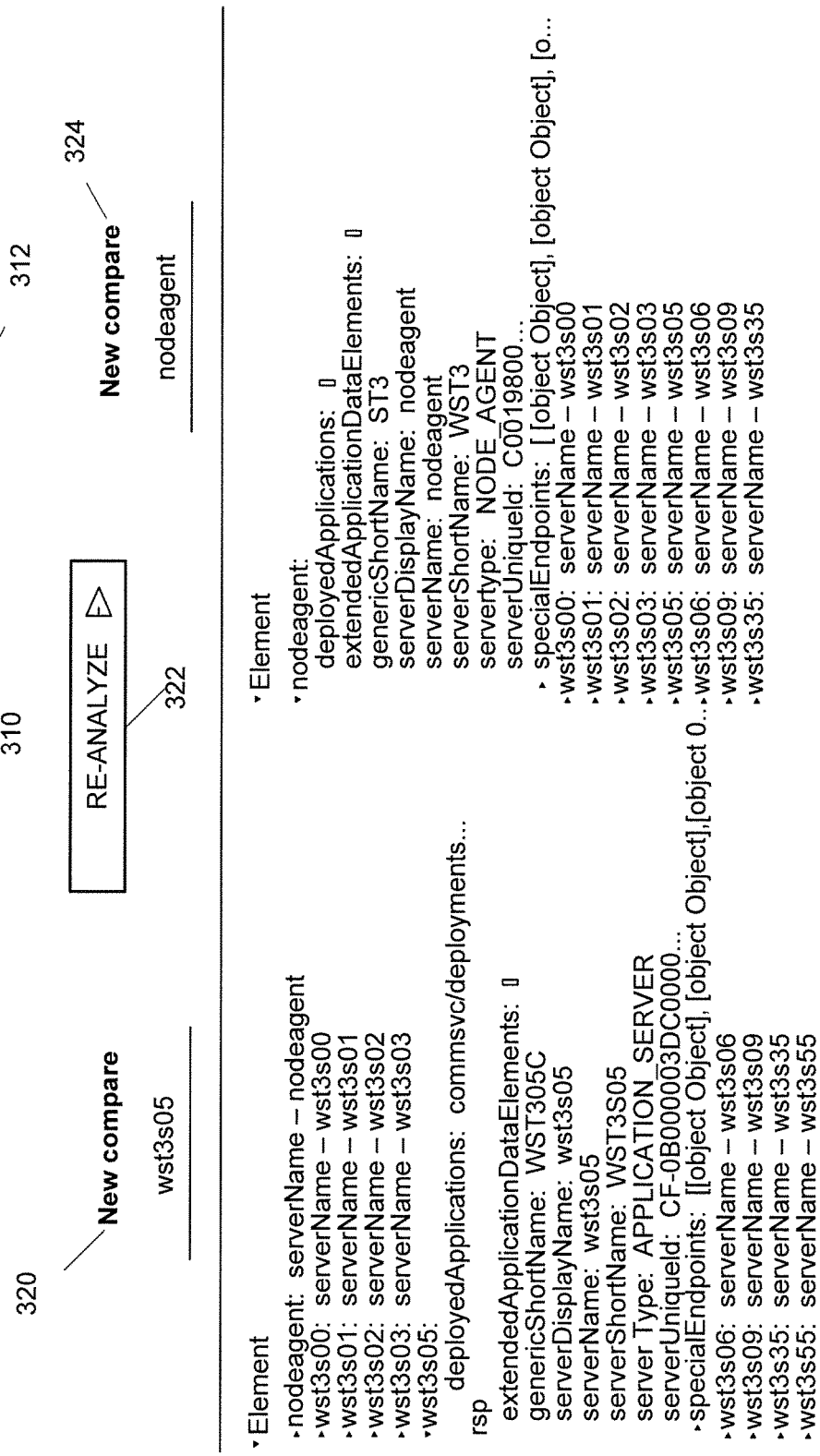
FIG. 3 is an exemplary interface that illustrates a comparison, according to an embodiment of the present invention.

FIG. 3 is an exemplary interface that illustrates a comparison, according to an embodiment of the present invention. As shown in FIG. 3, the Monitoring Tool compares two servers, e.g., wst3snd (at 310) and wst3tnd (at 312). FIG. 3 allows shallow or in depth comparisons where the user may dig deeper into the settings. As shown in FIG. 3, a side-by-side comparison is provided between various elements, including node agent, server names, deployed applications, extended application data elements, generic short name, server display name, server name, server short name, server type, server unique identifier, special end points, etc. Other elements may be compared. FIG. 3 also provides a re-analyze feature 322 between wst3s05 (at 320) and a node agent (at 324). The re-analyze feature allows the user to dig down even further into the configuration. For example, the user may be presented with multiple nodes, where the user may perform a re-analyze feature on node x to y and may then be presented with a comparison between node x's and node y's servers (or other configuration).

FIG. 4 is an exemplary interface that illustrates an electronic communication, according to an embodiment of the present invention. As shown in FIG. 4, the Monitoring Tool provides a side-by-side comparison of various elements (at 410) of two servers (at 412, 414). In this example, a table format is shown. Other formats and graphics may be provided. Additional details of the comparison may be provided. The details may further include links to data. An embodiment of the present invention may support various forms of communications, which may include an electronic message, access to a dashboard or other interface, a text message, voice message and/or other formats.

Figure 5:
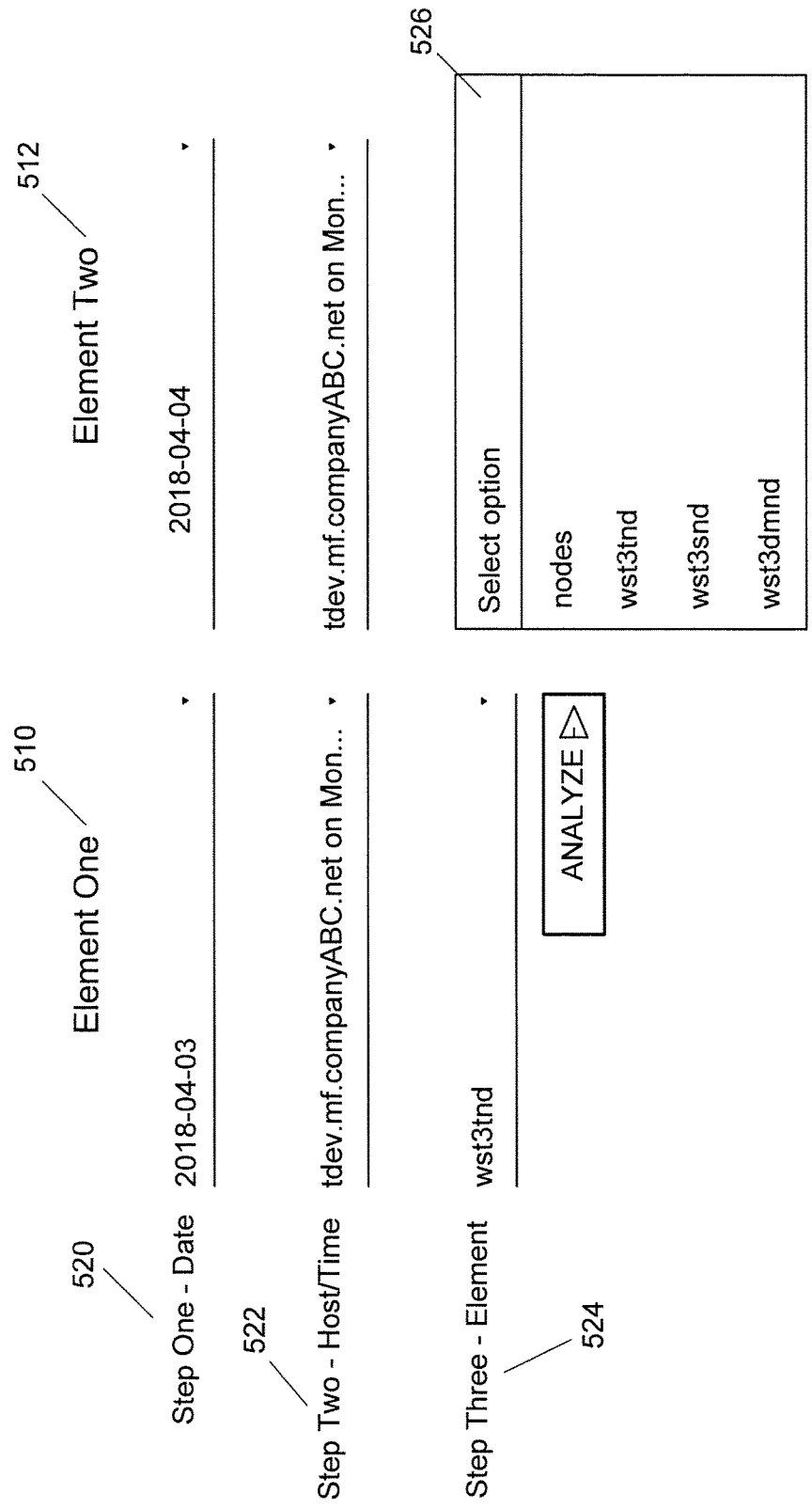
FIG. 5 is an exemplary interface that illustrates a server selection screen, according to an embodiment of the present invention.

FIG. 5 is an exemplary interface that illustrates a server selection screen, according to an embodiment of the present invention. FIG. 5 allows users to select the date (that the scan was done), then the system and time (that the scan was done on) and then finally what elements to compare (e.g., nodes, buses, servers, etc.). Elements may be represented at 510, 512. For example, the user may select servers and then initiate an analysis. In this example, data (at 520), host/time (at 522) and elements (at 524) may be selected for comparison and analysis.

Figure 6:
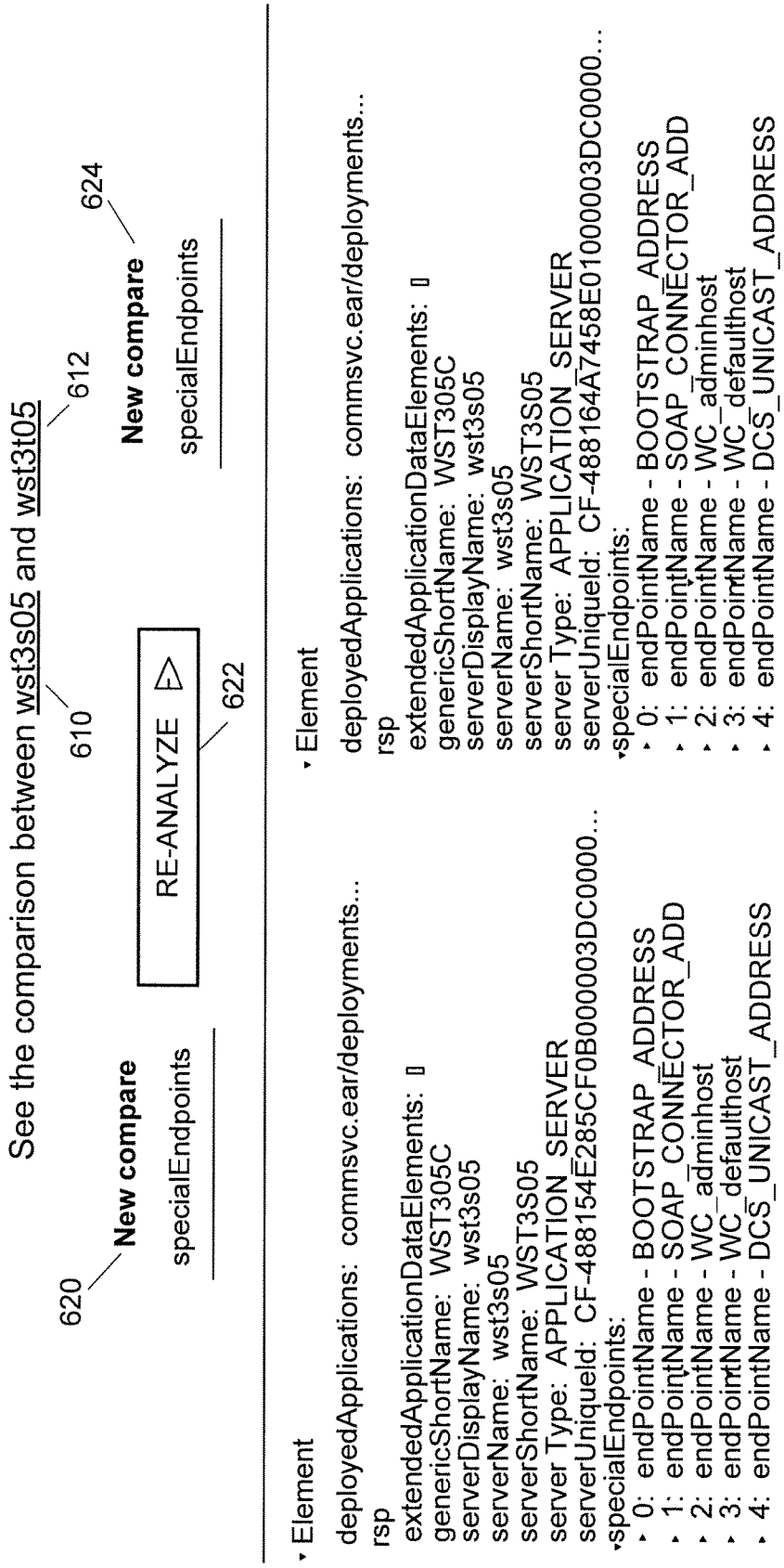
FIG. 6 is an exemplary interface that illustrates a comparison, according to an embodiment of the present invention.

FIG. 6 is an exemplary interface that illustrates a comparison, according to an embodiment of the present invention. As shown in FIG. 6, the Monitoring Tool may compare two servers, e.g., wst3s05 (at 610) and wst3t05 (at 612). As shown in FIG. 6, a side-by-side comparison is provided between various elements, including deployed applications, extended application data elements, generic short name, server display name, server name, server short name, server type, server unique identifier, special end points, etc. Other elements may be compared. FIG. 6 also provides a re-analyze feature (at 622) that analyzes a new comparison. In this example, analysis is performed between Special End-Points, as shown by 620 and 624.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a Server Configuration Drift Monitoring Tool, the system comprising:
   a database interface that accesses server configuration data stored in a database;
   a server interface configured to communicate with a Communication Server;
   an interactive user interface that receives user inputs and generates an interactive display; and
   a computer processor, coupled to the database interface, the server interface and the interactive user interface, configured to perform the steps of:
   communicating with one or more software agents, each software agent associated with a logical partition (LPAR) that comprises one or more servers;
   accessing, via the one or more software agents, configuration data for each of the one or more of servers associated with the LPAR;
   performing a side-by-side comparison of a set of elements between configuration data associated with a first server at a first point in time and configuration data associated with a second server at a second point in time; and
   communicating, via the interactive user interface, the side by-side comparison.

2. The system of claim 1, wherein the side-by-side comparison is formatted as an electronic communication transmitted to one or more recipients.

3. The system of claim 1, wherein the elements comprise server configuration elements.

4. The system of claim 1, wherein the second server is the same first server and the first point in time is different from the second point in time.

5. The system of claim 1, wherein the second server is associated with a second LPAR.

6. The system of claim 1, wherein the computer processor is configured to perform the step of:
   modifying one or more configuration settings associated with the one or more servers.

7. The system of claim 6, wherein the one or more configuration settings is modified to a previous state at a predetermined time period.

8. The system of claim 1, wherein the first server resides in a test environment and the second server resides in a production environment.

9. The system of claim 1, wherein the Server Configuration Drift Monitoring Tool runs on a Platform as a Service (PaaS).

10. The system of claim 1, wherein the interactive user interface comprises a date input, a host input and an element input.

11. A method that implements a Server Configuration Drift Monitoring Tool, the method comprising the steps of:
    communicating, via a communication network, with one or more software agents, each software agent associated with a logical partition (LPAR) that comprises one or more servers;
    accessing, via the one or more software agents, configuration data for each of the one or more of servers associated with the LPAR;
    storing, via a database interface, configuration data in a database;
    performing, by a computer processor, a side-by-side comparison of a set of elements between configuration data associated with a first server at a first point in time and configuration data associated with a second server at a second point in time; and
    communicating, via the interactive user interface, the side by-side comparison.

12. The method of claim 11, wherein the side-by-side comparison is formatted as an electronic communication transmitted to one or more recipients.

13. The method of claim 11, wherein the elements comprise server configuration elements.

14. The method of claim 11, wherein the second server is the same first server and the first point in time is different from the second point in time.

15. The method of claim 11, wherein the second server is associated with a second LPAR.

16. The method of claim 11, further comprising the step of:
    modifying one or more configuration settings associated with the one or more servers.

17. The method of claim 16, wherein the one or more configuration settings is modified to a previous state at a predetermined time period.

18. The method of claim 11, wherein the first server resides in a test environment and the second server resides in a production environment.

19. The method of claim 11, wherein the Server Configuration Drift Monitoring Tool runs on a Platform as a Service (PaaS).

20. The method of claim 11, wherein the interactive user interface comprises a date input, a host input and an element input.

* * * * *